United States Patent Office 3,660,367
Patented May 2, 1972

3,660,367
NITROSO POLYMERS
Nathan Mayes, Barrington, R.I., and Ronald Michaels, Boonton, N.J., assignors to Thiokol Chemical Corporation, Bistol, Pa.
No Drawing. Filed Nov. 13, 1968, Ser. No. 775,528
Int. Cl. C08f 3/24
U.S. Cl. 260—92.1             9 Claims

ABSTRACT OF THE DISCLOSURE

A linear nitroso polymer has been provided by polymerizing monomers with pendant, convertible moieties which are crosslinkable. These monomers with the crosslinkable, pendant groups cannot be introduced into the polymer directly; hence, the contribution resides in the route of incorporating precursor moieties in the polymer backbone and then obtaining a polymer. The polymers with the convertible, pendant groups are derived from recurring units as represented by the general formulae:

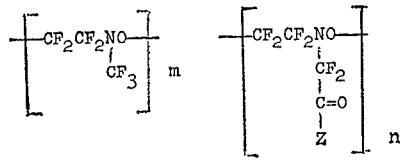

or

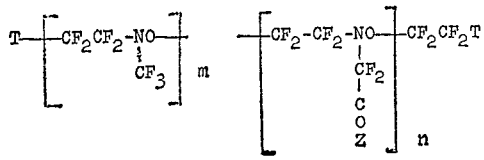

wherein Z is a —O-(lower alkyl) group of 1 to 7 carbon atoms or chlorine; and T is a halogen, a perhaloalkyl, —NO, or —NO$_2$; and the ratio $m:n$ is from 0:1 to 50:1. Liquid and solid polymers are provided as well as elastomers derived therefrom. A method for preparing and converting these monomers has also been disclosed.

---

This invention relates to novel polymers and methods for production of these polymers. More particularly, this invention relates to the polymerization of difluoronitrosoacetates and/or acetyl chlorides with nitroso trifluoro methane and tetrafluoro ethylene; and it relates to liquid, gum and elastomeric products of this polymerization.

Recent demands for extremely fire resistant materials, especially materials which do not readily burn in an oxygen atmosphere have been prompted by the ready inflammability of conventional polymers in this atmosphere. Moreover, industrial uses have required materials confining highly aggressive corrodents such as oxidizers.

In answer to these problems, numerous solutions have been proposed, prominent of which has been the proposal to use nitroso rubbers. These rubbers are the crosslinked products of a polymer consisting of recurring units derived from a nitroso moiety containing perfluoro compound, a nitroso moiety containing perfluorocarboxylic acid esters wherein the carboxylic acid is a nitroso perhalobutyric acid or higher homologues thereof, and a halogen substituted olefin.

Despite a number of attractive properties of these elastomers, applications of these polymers have not been widespread. A major reason for the lack of use has been the prohibitive cost associated with the production of these elastomers. Thus, one of the major sources of problems has resided in the incorporating of a cross-linkagle moiety in the nitroso copolymer via an easily obtainable monomer.

Previous art attempt to cross-link this polymer has been directed to incorporating a crosslinkable moiety in the form of a nitroso halo carboxylic acid monomer. Thus, heretofore the major effort has been directed to the discovery of a simpler synthesis step for producing the nitroso halo carboxylic acid monomer.

Although the nitroso perhalo carbon compound has been difficult to synthesize, the synthesis of nitroso perhalo carboxylic acids or esters has been even harder; and up to this point, it has been impossible to circumvent the multiple step synthesis of these compounds.

It has now been found that the nitroso polymers may be more easily prepared in fewer synthesis steps in a more economical and better manner by incorporating an appropriate monomer in a polymer and then converting a moiety of the same into a crosslinkable moiety or by even converting the precursor polymer into an elastomer directly. Moreover, it has now been found that the synthesis steps employed have diminished a hazard encountered in the production of the prior art are carboxylic acid monomers, i.e., explosions. Thus, it has now been found that some of the polymers, i.e., those containing the ester or the acyl moieties may be crosslinked, that is cured without the need for the conversion of the same to the free carboxylic acid.

Further advantages will be apparent or pointed out in the discussion to follow.

According to the invention, the novel polymers are depicted by recurring units based on the monomer derivatives and are as follows:

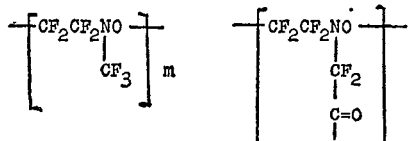

and/or

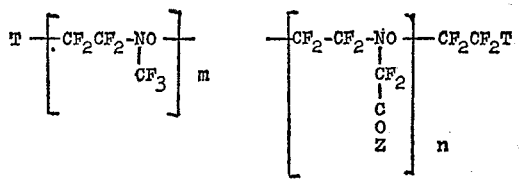

wherein Z is a —O-(lower alkyl) group of 1 to 7 carbon atoms or chlorine; and T is a halogen, a perhaloalkyl, —NO, or —NO$_2$; and the ratio $m:n$ is from 0:1 to 50:1. An optimum ester termonomer derivative constitutes 1 to 15 mole percent preferably up to about 10 mole percent of ester.

These novel nitroso co-, ter-, and tetra-polymers are obtained by the condensation of a halo or perhalo olefin with a nitroso perhalo carbon compound and/or a nitroso perhalo acetic acid ester or acyl derivative. Nitroso terpolymers containing ester groups and the hydrolysis of such ester groups to free acid groups are disclosed in copending application Ser. No. 754,488 filed Aug. 21, 1968, but the claims of said copending application are concerned with the curing of nitroso polymers containing free acid groups.

As the halo olefin monomer in the polymer, fluoro olefins may be readily used. Of these the most commonly used and preferred species are the perfluoro olefins of which tetrafluoro ethylene is outstanding. Other suitable compounds are of the general formula: $X_2C{=}CXR$, where X is a halogen moiety such as chlorine, bromine, or fluorine, preferably fluorine, and R is a halogeno substituted hydrocarbon of up to 3 carbon atoms or a perhalogeno radical, preferably a perfluoro radical.

A representative example of the nitroso perfluoro carbon group of compounds is nitroso trifluoro methane. In general, perfluoro compounds based on carbon compounds with up to 5 carbon atoms may be employed. However, nitroso trifluoro methane is most commonly employed, and it is also the preferred species. Numerous references are found describing the preparation of this class of monomers and, hence, the background information can be readily had from these references.

As a third monomer in the nitroso copolymer, the nitroso perhalo acetic acid ester or acetyl chloride derivative or mixtures of the same have been found most useful in place of the nitroso perhalo carboxylic acid. These compounds are represented by the following formula: ON—CF$_2$—COZ wherein Z is —O-(lower alkyl) radical or chlorine. A preferred and most desirable sub-group of these compounds are th lower alkyl esters of the nitroso perhalo acetic acid or the lower alkyl perhalonitrosoacetates. The lower alkyl moiety is such as methyl, ethyl, propyl, isopropyl, butyl, iso-butyl, t-butyl, pentyl, hexyl, and heptyl.

The above-defined lower alkyl perhalonitroso acetate monomer may be prepared in a three step sequence illustrated by the following schematic reaction routes:

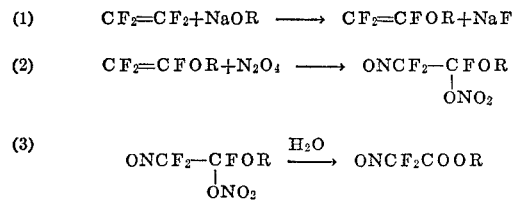

wherein R is a lower alkyl. Preparation of the first step intermediate is known and is disclosed in the prior art. The next step is carried out by adding to the ether nitrogen tetraoxide at low temperatures, e.g., —70° C., in a solvent such as CFCl$_3$. Hydrolysis of the formed nitroso intermediate produces the ester in the final step, but the nitroso perfluoro acetic acid cannot be obtained from the ester without destroying the nitroso group.

Preparation of the difluoronitrosoacetyl chloride is carried out in a two step sequence:

(1) $CF_2=CFOR + NOX \rightarrow ONCF_2—CFX—OR$ (2) $ONCF_2—CFX—OR + AlCl_3 \rightarrow$
$ONCF_2COCl$ (plus $ONCF_2COF$)

The preparation of the first intermediate is known. The second step is novel in that the aluminum chloride promoted cleavage takes place at low temperatures (about 0° C.) under anhydrous conditions. As the reaction is quite violent, it should be carried out in a medium such as tetrachloroethane.

The preparation of the polymers is carried out in a heavy wall container such as a Pyrex tube or an autoclave. As a solvent, halogenated hydrocarbon compounds are useful such as methylene chloride. Air from the reaction vessel is first evaculated by the freeze-thaw method. Generally, the solvent and the nitroso ester is introduced into the vessel and the contents cooled to liquid nitrogen temperature (—196° C.). Thereafter, the perhalo ethylene is charged to the vessel at a liquid nitrogen temperature. If the nitroso perhalo carbon compound is introduced into the vessel in which the reaction is taking place, then it is also cooled to liquid nitrogen temperature before it is charged to the reaction vessel, or it can be introduced into the vessel as gas and condensed at liquid nitrogen temperature.

Reaction temperatures employed in the polymerization step are generally within the range from —60° C. to +50° C. A preferred range is from —40° C. to —25° C.

The polymerization can be carried out in bulk or in an inert organic reaction medium, e.g., methylene chloride or acetone or in an aqueous suspension. A range of 30 minutes and even up to 200 hours and more is encountered for the reaction period, but usually the reaction period is between 4 and 90 hours.

In order to obtained liquid polymers, the polymerization is carried out as described above, except that a minor amount of a radical chain terminator is employed and the appropriate polymerization method must be employed, i.e., bulk, organic solvent, or an aqueous suspension system. Typical radical chain terminators suitable for use in the polymerization process are: halogens, alkyl halides, nitric oxide, or nitrogen dioxide. As the polymerization reactions used determines the use of a suitable terminator, or vice versa, care should be taken to select the proper type. Thus, if the terminator is nitrogen dioxide, it reacts with water in an aqueous suspension polymerization.

In case the formed co-, ter-, or tetra-polymer tends to build up excessive heat in the reaction such as when a solution precipitation reaction takes place and when the polymer continues to react in the precipitated phase, improved heat transfer can be achieved if a proper solvent is used in addition or in place of methylene chloride.

When a radical chain terminator is used, the polymerized products of the present process are liquid nitroso rubber prepolymers having molecular weights below about 20,000 and viscosities ranging from 1,000 to 300,000 cp. at 25° C. When no radical chain terminator is used, the molecular weight is determined by viscosity measurements of similar polymers displaying approximate viscosity-molecular weight correlations applicable to the polymers herein. On basis of these data, the molecular weights of the liquid polymers are generally below about 20,000 while the molecular weights of the solids, i.e., gums, range up to 500,000 with 300,000 being a fairly representative upper range, the lower range being previously defined above. Of course, a very sharp demarcation is not encountered, and, hence, these ranges must be so understood.

As indicated above, the terminator may be a halogen such as elemental chlorine, bromine or iodine, a perfluoro alkyl halide, preferably a halide wherein the alkyl group contains 1 to 4 carbon atoms, e.g., perfluoro methyl chloride, perfluoro ethyl bromide, or perfluoro ethyl iodide, or nitric oxide or nitrogen dioxide. The terminator is used desirably to the extent of 1 to 10 mole percent based on the total moles of monomer in the polymerization reaction mixture. The preferred terminator is elemental chlorine, since it has been found that by using chlorine, a relatively high degree of control of the fluidity of the product polymer can be achieved by varying the amount of chlorine used. The liquid copolymers and terpolymers are cured through the ester group either directly or by converting the polymer in bulk to carboxy and then curing the same. Preparation of the liquid polymers is described in a companion application Ser. No. 716,360, filed Mar. 27, 1968, the disclosure of which in respect to this preparation is incorporated by reference herein.

The nitroso rubbers are particularly outstanding in their resistance to attack by strong oxidizing agents and are of interest as materials for making gaskets, diaphragms, flexible containers and foams, etc., materials which are exposed to such oxidizing agents.

While such curable rubbers are useful for many of the applications noted above, there are other applications, such as sealing or potting applications, where it is desirable to have a rubber prepolymer in liquid form capable of being cast or otherwise caused to flow into an irregular, confined space and thereafter converted into an elastomer.

As an added facet of this invention, the ester moiety as well as the acyl chloride moiety pendant from the polymer backbone may be converted into a carboxylic moiety by merely hydrolyzing the same with water either at elevated temperature in an autoclave or in case of the acyl chloride moiety even at atmospheric conditions. A crosslinkable carboxy group is, thus, obtainable after the formation of the polymer rather than being introduced into a polymer as a moiety of the polymer forming monomer which is impossible anyway in case of the acetates, as the nitroso moiety decomposes before the carboxylic acid moiety is obtained.

Curing of the ester moiety is accomplished directly with an epoxide, metal oxides, and metal salts such as chromium III trifluoroacetate. Suitable epoxy curatives are polyepoxy compounds such as dicyclopentadiene dioxide or a compound of the general formula:

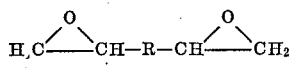

wherein R is an aliphatic or hydrocarbon moiety or an alicyclic moiety of up to 10 carbon atoms.

Suitable metal oxides are magnesium oxide which is preferred and calcium oxide, zinc oxide, cadmium oxide, or barium oxide as well as mixtures of the aforesaid oxides.

Curing of the polymer is effected at temperatures up to about 250° C. Although higher temperatures may be used, from 100° C. to 200° C. is a more suitable temperature range. Curing at the above temperature may be carried out up to about 24 hours with stepwise increases in curing temperature if needed.

The following examples are illustrative of the above-described invention; however, these examples are offered for purpose of depicting the invention and are not to be construed as limiting the broader scope of the described invention.

EXAMPLE 1

This example describes the general method followed for preparing the polymers and in this instance illustrates the preparation of a copolymer of recurring units derived from methyl difluoronitrosoacetate and tetrafluoro ethylene. The vessel used for this preparation was a heavy wall Pyrex tube of 100 ml. volume. It was fitted with a metal screw cap assembly including a Hoke needle valve for charging and discharging gases. The screw cap seal to glass was made with a Viton O-Ring.

Reagent grade methylene chloride, 16 ml., and methyl difluoronitrosoacetate (ONCF$_2$COOH$_3$, 4.8 g., 0.035 mole), were charged, as liquids, to the reaction vessel which was then closed by means of the screw cap. The vessel was cooled to liquid nitrogen temperature (−196° C.), evacuated using the needle valve, and all air removed by the freeze-thaw method. Tetrafluoro ethylene (C$_2$F$_4$; 3.5 g., 0.035 mole) was then charged to the vessel by condensing it at liquid nitrogen temperature therein. The needle valve was closed and the reaction initiated by placing the vessel in a liquid bath maintained at −25° C. and agitating by shaking for 90 hours.

The product was obtained, after venting some gaseous by-product and removal of solvent by evaporation, as a clear, colorless soft gum polymer weighing 5.4 g. (65% yield). Infrared analysis confirmed the structure as ONCF$_2$COOCH$_3$/C$_2$F$_4$ copolymer with absorption in the 7.7 to 8.8 micron region indicative of >CR$_2$, at 5.6 microns indicative of >C=O, and at 3.4 microns for >CH$_2$.

EXAMPLE 2

A terpolymer of nitroso trifluoro methane, tetrafluoro ethylene and methyl difluoronitrosoacetate were prepared by following the same procedure as in Example 1, except that after charging C$_2$F$_4$, the required quantity of CF$_3$NO was also charged by condensing it at liquid nitrogen temperature in the vessel.

The reactants and solvents were used in the following amounts:

|  | Mole |
|---|---|
| CF$_3$NO (6.93 g.) | 0.07 |
| C$_2$F$_4$ (10.00 g.) | 0.10 |
| ONCH$_2$COOCH$_3$ (4.18 g.) | 0.03 |
| CH$_2$Cl$_2$, 35 ml. | |

The reaction was conducted at 0° C. for 90 hours. Product was obtained as a gum, weighing 16 g. (yield 76%). Infrared analysis indicated the terpolymer structure by absorptions at 3.4 microns for >CH$_2$ at 5.6 microns for >C=O and in the 7.7 to 8.8 micron region for >CF$_2$ and —CF$_3$.

EXAMPLE 3

A terepolymer of nitroso trifluoro methane, tetrafluoro ethylene and ethyl difluoronitrosoacetate was prepared by following the same procedure as in Example 1 and Example 2.

The reactants and solvent were used in the following amounts:

|  | Mole |
|---|---|
| CF$_3$NO (3.96 g.) | 0.04 |
| C$_2$F$_4$ (5.0 g.) | 0.05 |
| ONCF$_2$COOC$_2$H$_5$ (1.53 g.) | 0.01 |
| CH$_2$Cl$_2$, 21 ml. | |

The product was a clear, colorless gum weighing 7.3 g. (69.5% yield). Infrared analysis indicated the terpolymer structure with absorptions at 3.32 microns for >CH$_2$, at 5.63 microns for >C=O, at 7.3 microns for >C—CH$_3$ and in the 7.7 to 8.8 micron region for >CF$_2$ and —CF$_3$.

Two grams of the gum product were mixed with 0.2 grams of UNOX 202 (Union Carbide Trademark for a dicyclo diepoxy carboxylate) and heated at 110° C. for 24 hours. During this time the gum cured to an elastomeric solid with Shore A hardness of 45.

EXAMPLE 4

A liquid terpolymer was prepared by following the same procedure as in Example 3, except for addition of required quantity of NO$_2$ by condensing it at liquid nitrogen temperature in the autoclave.

The monomers, chain terminator and solvent were used in the following amounts:

|  | Mole |
|---|---|
| CF$_3$NO (31.7 g.) | 0.32 |
| C$_2$F$_4$ (40.0 g.) | 0.40 |
| ONCF$_2$COOC$_2$H$_5$ (12.2 g.) | 0.08 |
| —NO$_2$ (1.84 g.) | 0.04 |
| Acetone, 172 ml. | |

The reaction was conducted at −40° C. for 90 hours. The product was obtained as a clear, colorless liquid of Brookfield viscosity of 40,000 centipoises (cp.) at 25° C. The weight of product was 78 g. for a 91% yield. Infrared analysis exhibited absorption for >CH$_2$ at 3.32 microns at 5.65 microns for >C=O, at 7.3 microns for >C—CH$_3$, and in the 7.7 to 8.8 micron region for >CF$_2$. An absorption was present at 6.25 microns for —NO$_2$.

Seventy-five grams of liquid polymer product were placed in a 500 ml. round bottom Pyrex flask and heated while being stirred vigorously with 200 ml. of water at 100° C. Periodic sampling and infrared analysis indicated after 120 hours of treatment that a significant portion of the ester groups had hydrolyzed to carboxy. This was evident by reduction of the >CH$_2$ absorption at 3.32 microns and the appearance of a broad absorption at 3.1 to 3.4 microns for the —OH of carboxy moiety. The absorption at 5.65 microns originally for C=O of ester remained as C=O of COOH.

EXAMPLE 5

A terpolymer of nitroso trifluoro methane, tetrafluoro ethylene and ethyl difluoronitrosoacetate was prepared in suspension as follows:

In a 300 ml. capacity stirred autoclave (Autoclave Engineers, Inc.) was introduced 50 ml. of distilled water containing 20 g. of lithium bromide (freezing point depressant) and 1.5 g. of magnesium carbonate (suspending agent). The liquid monomer ethyl difluoronitrosoacetate ($ONCF_2COOC_2H_5$, 1.39 g., 0.01 mole) was then added and the mixture was degassed by the freeze-thaw method. Trifluoro nitroso methane (3.96 g., 0.04 mole) and tetrafluoro ethylene (5.0 g., 0.05 mole) were charged as gases under pressure to the autoclave at $-25°$ C. The autoclave was sealed and the mixture stirred for 24 hours at $-25°$ C. The product was obtained as a finely divided, white solid in suspension which coagulated to a gum rubber upon acidification of the suspension with aqueous hydrochloric acid. The weight of the product was 8.3 g. (80% yield). Infrared analysis showed absorptions at 3.32 microns for $>CH_2$, at 5.65 microns for $>C=O$ and at 7.3 microns for $>C-CH_3$. There was no evidence that hydrolysis of ester groups had occurred.

EXAMPLE 6

Terpolymerization of nitroso trifluoro methane, tetrafluoro ethylene, and ethyl difluoronitrosoacetate was carried out in bulk as follows:

The liquid monomer $ONCF_2COOC_2H_5$ (1.39 g., 0.01 mole) was added to a Pyrex reactor tube and the same degassed by the freeze-thaw method. To the evacuated reactor was then added by condensing the gases at liquid nitrogen temperature trifluoro nitroso methane (3.96 g., 0.04 mole) and tetrafluoro ethylene (.50 g., 0.05 mole). The vessel was then sealed, allowed to warm to $-50°$ C. and remain at this temperature for 20 days. The product was obtained as a clear, rubbery gum of weight 8.9 g. (86% yield). The infrared spectrum showed the presence of ethyl ester by absorptions at 3.32, 5.65, and 7.3 microns.

As an indication of molecular weight, the intrinsic viscosity of the product in perfluoro tributyl amine solution was determined to be 0.4. The relationship of intrinsic viscosity to molecular weight is $[\eta]=KM^a$. The values of K and $a$ for $CF_3NO/C_2F_4$ copolymer in perfluoro tributyl amine solution are $8.77 \times 10^{-5}$ and 0.66, respectively. An approximate molecular weight of the

terpolymer obtained using these constants for the approximation is therefore 300,000.

EXAMPLE 7

An acyl-chloride-group-containing terpolymer was obtained by polymerizing nitroso trifluoro methane, tetrafluoro ethylene, and difluoronitrosoacetyl chloride.

The monomers and solvent were used in the following amounts:

| | Mole |
|---|---|
| $C_2F_4$ (15.0 g.) | 0.15 |
| $CF_3NO$ (13.35 g.) | 0.135 |
| $ONCF_2COCl$ (2.145 g.) | 0.015 |
| $CH_2Cl_2$, 60 ml. | |

The reaction was conducted as described above in Example 6 for 90 hours at $-40°$ C. The product was obtained as a viscous liquid of weight 16.7 g. for a 55% yield. An infrared spectrum exhibited an absorption at 5.5 microns indicative of the acyl chloride structure.

Treatment of the polymer with water or more simply by exposure of small sample of polymer to the atmosphere result in hydrolysis of the acyl chloride moiety to yield the carboxy moiety. This was illustrated by the disappearance in the IR spectrum of the absorption at 5.5 microns and the appearance of absorptions at 3.1 to 3.4 for OH of COOH and at 5.65 microns for $C=O$ of COOH.

To cure the polymer containing pendant —COOH groups, 2 g. of polymer were mixed with 0.1 g. of UNOX–207X (dicyclo pentadiene dioxide) and heated at $60°$ C. for 4 hours. The cure was evident by the conversion of the viscous liquid mix to a non-tacky rubbery solid.

What is claimed is:

1. A linear nitroso polymer derived from recurring units represented by the general formulae

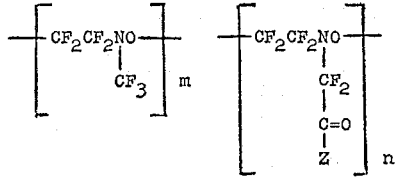

or

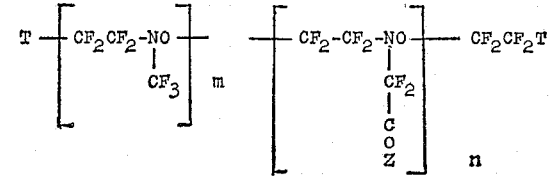

where Z is a —O-(lower alkyl) group of 1 to 7 carbon atoms or chlorine; and T is a halogen, a perhaloalkyl, —NO, or —$NO_2$; and the ratio $m:n$ is from 0:1 to 50:1.

2. A polymer according to claim 1 wherein Z is chlorine.

3. A polymer according to claim 1 wherein the lower alkyl moiety is methyl or ethyl.

4. A liquid polymer according to claim 1 having a viscosity of 1,000 to 300,000 cp. at $25°$ C.

5. A liquid polymer according to claim 1 wherein the lower alkyl is methyl and T is chlorine.

6. A process for making a nitroso polymer which comprises polymerizing perfluoro nitroso methane, tetrafluoro ethylene and an alkyl perfluoronitrosoacetate or perfluoronitrosoacetyl chloride wherein the alkyl group has 1 to 7 carbon atoms in a molar ratio of 0:1:1 to 1:1.02:0.02 at a temperature of $-60°$ to $50°$ C., and recovering the resulting polymer from the polymerization reaction mixture.

7. A process according to claim 6 and wherein the polymerizing is carried out in the presence of halogen, a perhaloalkyl compound, —NO or, —$NO_2$ and recovering the resulting liquid polymer from the polymerization mixture.

8. The process according to claim 6 wherein the molar ratio of the monomers is 1:2:1 to 1:1.02:0.02.

9. An elastomeric product of the polymer as defined in claim 1.

References Cited

UNITED STATES PATENTS

| 3,065,214 | 11/1962 | Rose | 260—92.1 |
| 3,197,451 | 7/1965 | Haszeldine | 260—92.1 |
| 3,321,454 | 5/1967 | Crawford et al. | 260—92.1 |
| 3,417,068 | 12/1968 | Knoll | 260—92.1 |

HARRY WONG, JR., Primary Examiner

U.S. Cl. X.R.

260—2.5, 91.7, 92.8, 487, 539, 544, 647